United States Patent
Becker et al.

(10) Patent No.: US 8,201,192 B2
(45) Date of Patent: Jun. 12, 2012

(54) APPARATUS AND METHOD FOR PROCESSING DATA IN DIFFERENT MODALITIES

(75) Inventors: Detlef Becker, Möhrendorf (DE); Karlheinz Dorn, Kalchreuth (DE); Vladyslav Ukis, Didsbury/Manchester (GB); Hans-Martin Von Stockhausen, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 1467 days.

(21) Appl. No.: 11/513,177

(22) Filed: Aug. 31, 2006

(65) Prior Publication Data

US 2007/0055977 A1 Mar. 8, 2007

(30) Foreign Application Priority Data

Sep. 1, 2005 (DE) .......... 10 2005 041 628

(51) Int. Cl.
*G06F 9/44* (2006.01)
*G06F 15/16* (2006.01)
(52) U.S. Cl. ............ 719/328; 709/229
(58) Field of Classification Search ............ 719/328
See application file for complete search history.

(56) References Cited

U.S. PATENT DOCUMENTS

| | | | |
|---|---|---|---|
| 7,007,280 B1* | 2/2006 | Dermer | 719/316 |
| 7,028,182 B1* | 4/2006 | Killcommons | 713/161 |
| 7,337,174 B1* | 2/2008 | Craig | 707/100 |
| 2002/0032783 A1* | 3/2002 | Tuatini | 709/229 |
| 2002/0035645 A1* | 3/2002 | Tuatini | 709/310 |
| 2003/0101291 A1* | 5/2003 | Mussack et al. | 709/328 |
| 2003/0135609 A1* | 7/2003 | Carlson et al. | 709/224 |
| 2004/0122719 A1* | 6/2004 | Sabol et al. | 705/7 |
| 2005/0013259 A1* | 1/2005 | Papoushado et al. | 370/254 |
| 2005/0091655 A1* | 4/2005 | Probert et al. | 718/100 |
| 2005/0144226 A1* | 6/2005 | Purewal | 709/203 |
| 2005/0262200 A1* | 11/2005 | Moritzen | 709/204 |
| 2005/0262480 A1* | 11/2005 | Pik et al. | 717/120 |
| 2006/0041890 A1* | 2/2006 | Pik et al. | 719/315 |
| 2006/0287740 A1* | 12/2006 | Ertel | 700/65 |
| 2007/0041626 A1* | 2/2007 | Weiss et al. | 382/131 |

FOREIGN PATENT DOCUMENTS

| | | |
|---|---|---|
| DE | 196 25 842 A1 | 1/1998 |
| EP | 1 037 142 A2 | 9/2000 |

* cited by examiner

*Primary Examiner* — Andy Ho
*Assistant Examiner* — Abdou Seye
(74) *Attorney, Agent, or Firm* — Harness, Dickey & Pierce, P.L.C.

(57) ABSTRACT

An apparatus and a method for processing data in different modalities involve applications accessing service modules which are set up by a runtime environment at the time of loading in line with a configuration file. This allows data in different modalities to be edited flexibly and with a resource saving.

36 Claims, 10 Drawing Sheets

APPARATUS AND METHOD FOR PROCESSING DATA IN DIFFERENT MODALITIES

PRIORITY STATEMENT

The present application hereby claims priority under 35 U.S.C. §119 on German patent application number DE 10 2005 041 628.4 filed Sep. 1, 2005, the entire contents of which is hereby incorporated herein by reference.

FIELD

The invention generally relates to an apparatus for processing data in different modalities. For example, it may relate to one for processing data in different modalities with a multiplicity of resources used for data processing which are able to be used to execute at least one application for which at least one service module provides services.

The invention also generally relates to a method for processing data in different modalities.

BACKGROUND

An apparatus of and a method are known from DE 196 25 842 A1. As in the case of the known apparatus and the known method, the data in different modalities come from various medical appliances which record image data for medical diagnosis, in particular.

The image data are transmitted on the basis of the industrial standard DICOM and stored. The data are processed, in particular the medical data are conditioned for the graphical user interface, by applications which have been adapted to suit the various modalities. In the case of the known method and the known apparatus, the applications communicate with one another and read and write data on the basis of the DICOM standard using service modules which are designed on the basis of the OCX standard. These service modules are linked to the application at the time of design.

A drawback of the known apparatus and of the known method is that various service modules frequently need to be used for various applications. In addition, the assemblies for the service modules, which are frequently in the form of "DLLs", need to be present at runtime in the same form as for the implementation. Otherwise, the application threatens to become unstable.

Respective application-specific service components for each application are therefore frequently linked to the application and installed together with the application. When the application is executed, the respective service modules linked to the application must be loaded into the computer's main memory together with the application. In addition, new service modules also need to be installed with each new version of the application. If this is not done, this sometimes results in the application being unstable.

EP 1 037 142 A2 also discloses an apparatus and a method in which service modules are additionally configured for an application by appropriate entries in a configuration file. The service modules additionally configured for the application are loaded at the time of loading in line with the entries in the configuration file and are made available to the application.

SUMMARY

At least one embodiment of the invention is directed to an apparatus and/or a method which allows service modules to be employed flexibly and with a resource saving.

In the case of the apparatus and the method of at least one embodiment, a service module includes a service interface and a service implementation which are held in separate assemblies. In addition, the service implementation can be modified at the time of loading using configuration data from a runtime environment.

Separating the service interface and the service implementation allows the service implementation to be adapted to suit the requirements of the respective application. This can be done at the time of loading using appropriate configuration data. This allows one service implementation to be used for various applications and allows adaptations to be made only when these are required. Another advantage is the adaptability to suit the available resources. The apparatus and the method therefore allow the service modules to be handled flexibly and with a resource saving.

In one example embodiment, the runtime environment takes the configuration data as a basis for producing instances of the service modules called by the applications and manages the instances produced in a service repository. This affords the advantage that just one respective instance of a service module needs to be produced, since further calls can have just one reference to the instance returned.

The configuration data allow not just the service implementation used at runtime to be stipulated, but also the visibility of the various service modules to the applications. This ensures that the applications can call only those service modules which the applications are authorized to call.

In another example embodiment, the configuration data are application specific. This allows the service implementation to be adapted to suit the requirements of the calling application.

In addition, the configuration data may also be transport specific. Thus, the applications can be provided with service modules which provide services for applications beyond machine boundaries. For example, the service modules providing services beyond machine boundaries have at least one communication interface to remote service modules.

A service module of this kind allowing communication beyond machine boundaries may have the function of both a proxy and a server. The service module which has the function of a proxy is associated with a located machine, whereas the service module with the function of a server is on a remote machine. The application accessing the service module with the function of a proxy therefore obtains the service in a manner as though the service had been provided by a local service module.

In one specific example embodiment, the service modules have a common communication interface which can be used by all remote service modules which have the function of a proxy. This refinement allows central management of the requests sent by the service modules with the function of a proxy. In particular, prioritization and central interruption and resumption of the processing are possible.

In another example embodiment, the configuration data are resource specific. This allows the service modules to be adapted to suit the respective circumstances of the executing machine.

The resource specific configuration data may be determined at the time of installation. This can also be done using a pathfinder program, which determines the available resources before installation of the application with the associated service components and sets up the configuration data accordingly.

In addition, the service modules may include, for example, a further assembly containing an interface for adaptations to the service module. A separate adaptation implementation then implements the adaptation interface. The adaptation implementation can be additionally configured for a service module by modifying the configuration data associated with a service module. In this way, the service modules can be adapted to suit the respective circumstances and requirements.

A service module may also have associated configuration data which relate to a further service module used by the respective service module. This favors modular design in a plurality of layers and the reusability of generally used functions.

The internal structure of the service modules may include for example a call unit, an execution unit and an expansion repository in which the references assigned by the runtime environment to instances of other service modules used are managed.

BRIEF DESCRIPTION OF THE DRAWINGS

Further advantages and properties of the present invention can be found in the description below which provides a detailed explanation of example embodiments of the invention with reference to the appended drawings, in which.

DETAILED DESCRIPTION OF THE EXAMPLE EMBODIMENTS

Figure 1:
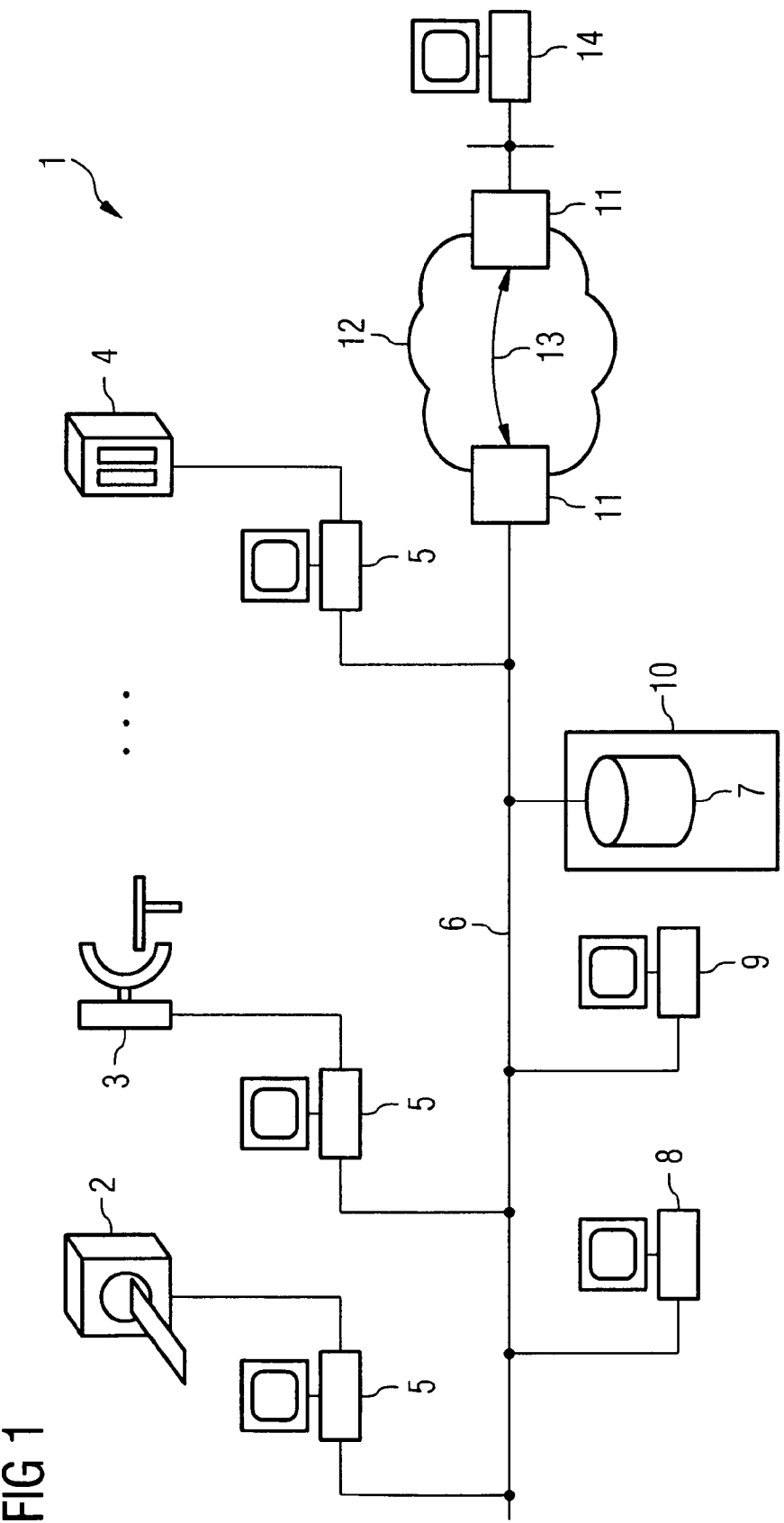
FIG. 1 shows a block diagram of a medical data network which is used for processing medical data in various modalities.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 shows a medical data network which is used to process data in various modalities. The data in various modalities are produced by various medical appliances. By way of example, FIG. 1 shows a magnetic resonance appliance 2, a computer tomograph 3 and an ordinary X-ray appliance 4. These medical appliances are operated using control units 5, which may be workstation computers. The control units 5 are connected to a local data network 6 and can store the image data produced in a central data store 7. The central data store 7 may be set up in a central server 10, for example. In addition, the local data network 6 has diagnostic appliances 8 and 9 connected to it which can be used for examining the image data recorded by the medical appliances, for diagnostic purposes.

The local data network 6 also has network interfaces 11 which allow transmission 13 which is set up in a global data network 12, for example the Internet, to be used to transmit medical data to a remote diagnostic appliance 14. By way of example, the remote diagnostic appliance 14 may be located in a doctor's practice, while the medical data network 1 is set up in a hospital.

Figure 2:
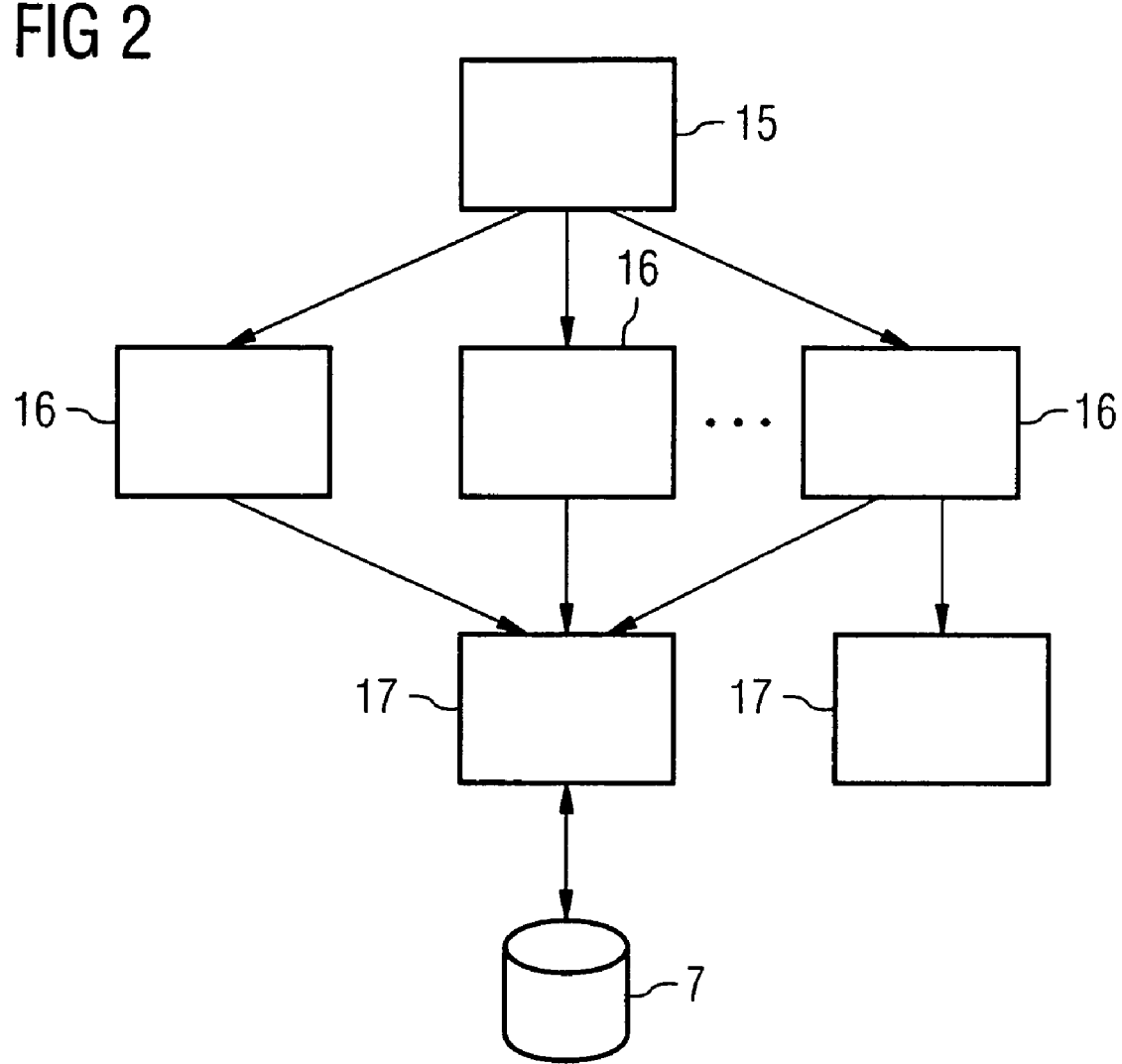
FIG. 2 shows the structure of a work process which is used to condition data in various modalities and to display them to a user.

FIG. 2 shows the structure of a work process which can be called up on one of the diagnostic appliances 8 or 9 by the medical personnel for diagnostic purposes. The work process 15 accesses various applications 16 which are provided for respectively processing data in various modalities. By way of example, a first application 16 may be provided in order to take the depth images recorded by the magnetic resonance appliance 2 and create a three-dimensional model of the body region of interest. In the same way, a second application 16 can take the projection images recorded by the computer tomograph 3 and create a three-dimensional volume image of the body region of interest. Finally, a third application 16 may be provided for examining X-ray images.

The applications 16 access service modules 17 which provide the applications 16 with generally usable functionalities. By way of example, one of the service modules 17 may have the function of a cache for DICOM data. A cache of this kind buffer-stores the data obtained from the central data store 7. A service module 17 of this kind reads DICOM files from the file system using functionalities which are provided by the operating system, analyzes and breaks down the contents in accordance with the DICOM standard and then allows random access to the DICOM attributes of this file. Using a service module 17 of this kind, an application 16 can load DICOM files, can read and alter their contents and can also store them as a DICOM file.

The application 16 can then forward a reference to the loaded DICOM data to other applications 16, which can use this reference to access the same data in the jointly used service module 17. Using the common service module 17 increases the efficiency of the work process 15, and the resources available for executing the work process 15 are saved. This is because DICOM files do not need to be called repeatedly, and it is not necessary to manage multiple copies of the DICOM files called.

Another advantage is when the common service module 17 provides further functionalities. By way of example, it should be possible to be able to correct errors in the DICOM files. The correction of errors can be activated by various triggers. By way of example, the error correction can be triggered when certain private DICOM markers are found. So that it is not necessary to produce a new version of the service module 17 for each new correction option, the service module 17 can be expanded dynamically through configuration at runtime, as explained in more detail below. By way of example, the service module 17 can be expanded either by correction algorithms or by initiation and selection mechanisms which identify when a correction is required and what correction algorithm needs to be used.

It may also be necessary to log access operations to the DICOM data and possibly to refuse access to data for security reasons, depending on the person attempting to access the data using the application 16. To be able to provide these functionalities, the service module 17 for its part needs to be able to access further service modules providing the functionalities required for auditing or data integrity. The functionalities required for auditing and data integrity sometimes vary for different installations. The service modules for auditing and data integrity are therefore likewise provided for the service module 17 through configuration.

Figure 3:
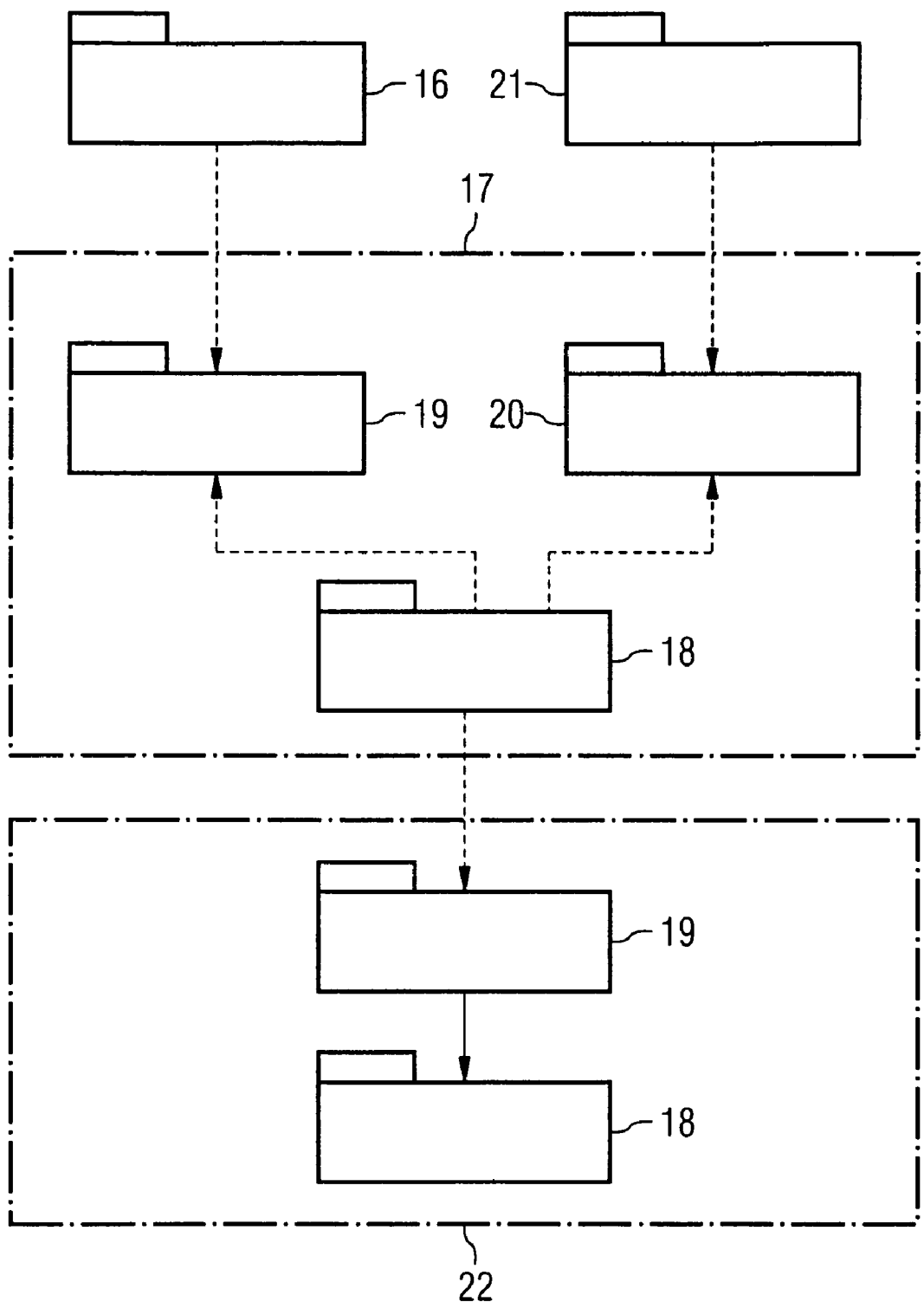
FIG. 3 shows the structure of the assemblies of a service module.

FIG. 3 shows the structure of the assemblies of the service modules 17. The service modules 17 have, in respectively separate assemblies, a service implementation 18 which supports a service interface 19, held in a further assembly, by virtue of the service implementation implementing the service interface 19. The service interface 19 makes the properties and methods of the service module 17 available to the application 16. In particular, the application 16 has a reference to the assembly which contains the service interface 19. Since the service interfaces 19 are invariant, this reference does not need to be changed when the service implementation 18 is changed.

The service interface 19 provides the application 16 with both synchronous and asynchronous methods, the flow notification for the asynchronously executed methods always being affected in the context of the respective process thread which requested execution of the asynchronous method.

The service module 17 also has an adaptation interface 20 which is likewise in a separate assembly. It is possible to combine all the adaptation interfaces 20 of a service module 17 in one assembly or else to create various assemblies for different adaptation interfaces of a service module 17. If the behavior of the service module 17 is intended to be altered, the adaptation interface 20 is implemented in one adaptation implementation 21 and the assembly of the adaptation implementation is additionally configured for the service module 17 in a manner which is described in more detail below.

The behavior of the service module 17 can therefore be influenced by the form of the adaptation implementation 21. The adaptation interface 20 can be used to influence the behavior of the service module 17 inter alia also in terms of the choice of a suitable selection strategy which chooses the best suited adaptation implementation from a plurality of adaptation implementations additionally configured for the service module 17.

The assembly of the service implementation 18 is dependent on various assemblies which contain interfaces. These assemblies include the assembly of the service interface 19, plus an assembly with at least one adaptation interface 20 which is called by the service implementation 18 when required, and also the assemblies of service interfaces 19 from further service modules 22 which are called by the service module 17. The references to the instances of the adaptation objects defined in the adaptation implementation 21 and also the references to the service objects defined in the further service modules 22 are obtained by the service implementation 18 at runtime from a runtime environment which is explained in more detail below.

The service implementation 18 is subject to versionization. More recent versions of the service implementation 18 must support the behavior of earlier service implementations 18 as far as the applications were able to observe this.

Figure 4:
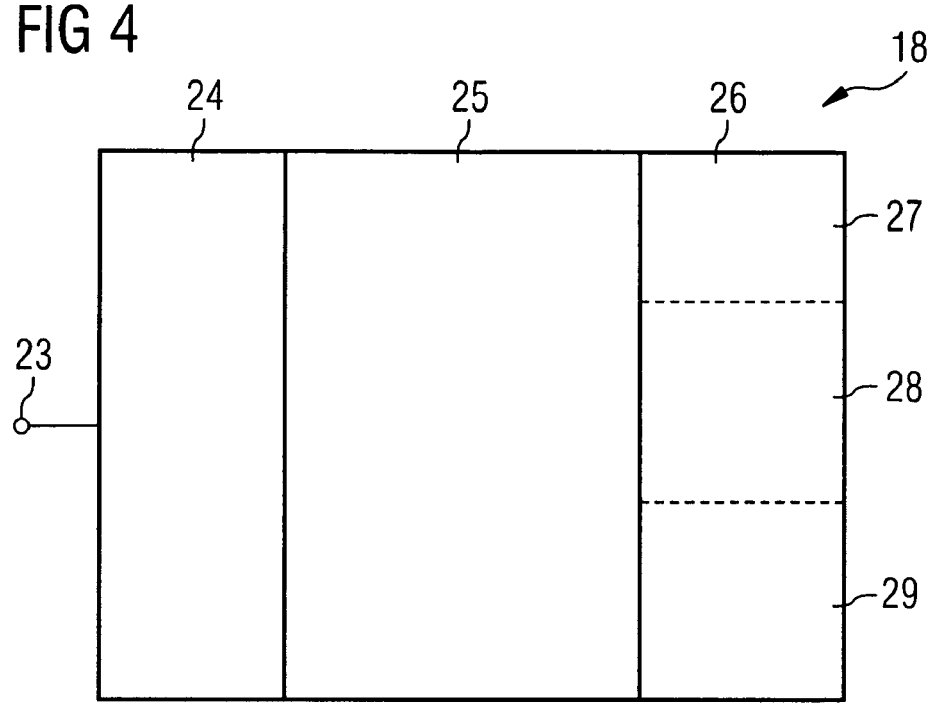
FIG. 4 shows the structure of the internal design of a service module.

FIG. 4 shows the internal structure of the service implementation 18. In this context, it is noted that the further service module 22 from FIG. 3 may be of the same design.

The service module 18 has a communication interface 23 which the service module 18 uses to interchange information with the superordinate application 16.

In addition, the service module 22 has an internal calling unit 24. All calls from applications 16 to the service module 18 are received by the calling unit 24 and are allocated to an internal execution unit 25. This allocation takes account of the internal requirements of the service implementation 21 and also of the calling application 16. In particular, the context of the called process thread and the details of the synchronous or asynchronous service implementation 18 must be taken into account. The requests coming from the application 16 can be allocated using a queue, for example, which is processed sequentially by the execution unit 25.

The execution unit 25 provides the service requested by the application 16 taking into account the adaptation implementation 21 additionally configured for the service module 17 and the further service modules 22 to be used which are additionally configured for the service module 17. In this context, the execution unit 25 should call the adaptation implementation 21 such that no kind of concurrent activities besides the service implementation 18 can arise within the adaptation implementation 21. By contrast, the further service modules 22 used can be called as desired, since they can be called by different process threads and different applications 16 simultaneously and return their results again in the correct context for the calling process thread. On the basis of the context of the calling process thread, the execution unit 25 needs to ensure that the progress reports, error reports and ready reports are reported back to the calling process thread in its context.

Finally, the service module 17 has an internal expansion repository 26 which is filled at runtime by the runtime environment, which will be described in more detail, with the references to the produced instances of the expansions which have been additionally configured for the service module 17. The expansions relate both to the adaptations contained in the adaptation implementations 21 and to the service modules 22 which are to be used by the service module 17. In FIG. 4, the service module 17 contains references 27 to instances of adaptation objects additionally configured for the service module 17, for example, and references 28 to selection methods provided for the service module 17 in the adaptation implementation 21 through configuration, and references 29 to instances of the service modules 22 which are to be used.

Figure 5:
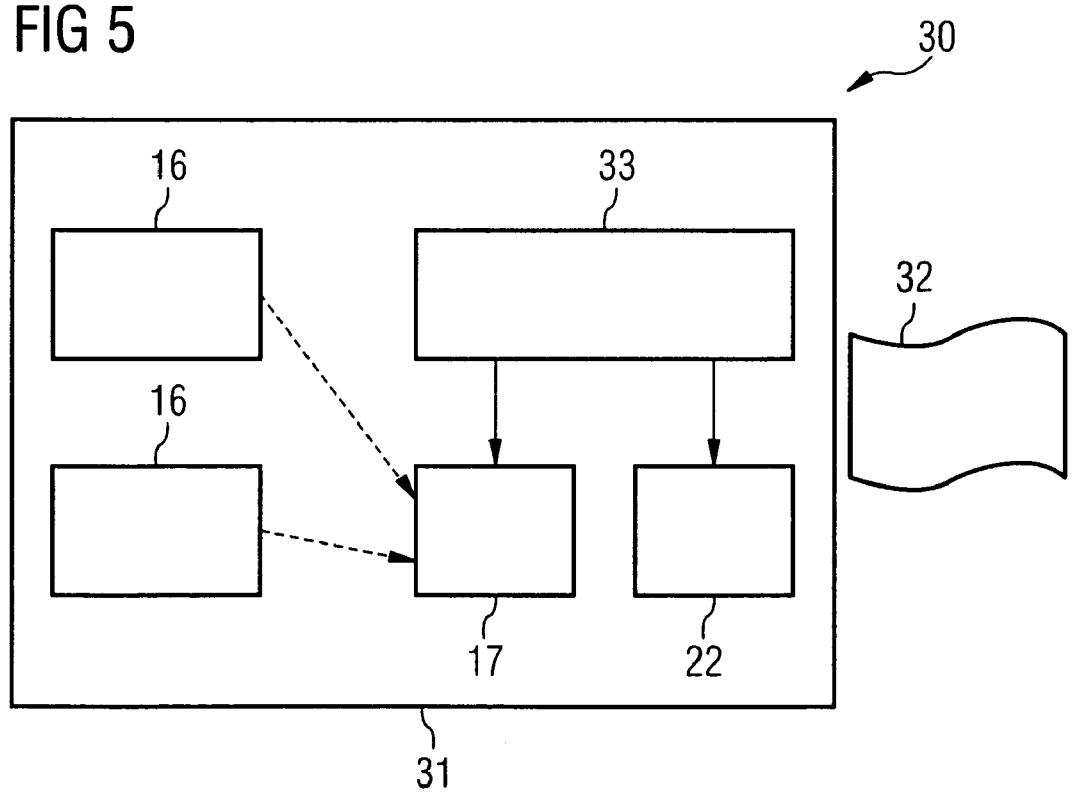
FIG. 5 shows the structure of a runtime environment which manages instances of the service modules.

FIG. 5 shows the structure of a runtime environment 30 which, inter alia, forwards the references 27 to 29 to the service module 17. The runtime environment 30 includes a container process 31, inter alia. A configuration file 32 contains the logical names of all the service modules 17 and 22 present and stipulates their visibility using appropriate entries. When a service module 17 or 22 is called for the first time, the runtime environment 30 produces an instance of the respective service module 17 or 22 and records it under the configured name in a service repository 33. The service repository 33 of the container process 31 contains all instances of the service modules 17 or 22 which have already been produced in the container process 31. When a service module 17 is called which has already had an instance produced, the response to the call contains a reference to the instance of the service module 17 or 22 which has already been produced.

The configuration file 32 can contain all the information for a service module 17 or 22. However, it is also possible for the individual service modules 17 to have a respective separate configuration file associated with them which contains a record of the adaptation implementations 21 and the further service modules 22 used. On the basis of this information and the content of the service repository 33, the runtime environment 30 produces references to instances which are present or produces new instances. These references can be accessed only in the relevant service module 17 for which the adaptation implementations 21 and the further service modules 22 have been configured.

To achieve version independence, a minimum version which the instance produced needs to satisfy is specified for each configured service module 17. The runtime environment 30 produces the respective most recently installed version of the service module 17 as an instance and ensures that more recent versions are not required in the configuration files.

It should be noted that the service module 17 can be seen by a plurality of applications 16 if these applications 16 use the same logical name for this service module 17 in the configuration file 32.

The architecture described here for the service modules 17 and 22 meets the following requirements: the service module can firstly be adapted to suit the needs of the using application through configuration. These adaptations relate both to the functionalities of the service module 17 itself and secondly to the other service modules 22 used by the service module 17.

Secondly, the number of instances of the service module 17 and their visibility to various applications 16 are stipulated by configuration.

In addition, the service module 17 takes account of the architecture of the process thread of the using application 16 by virtue of the service module 17 producing no concurrent activities which are visible to the application 16, but certainly providing asynchronous methods. Progress reports, error reports and termination messages are made available in the case of asynchronous calls by the using application 16 within the context of the process thread of the using application 16.

In addition, the application 16 is independent of the version of the service module 17. This is because the application 16 is not linked to the implementation of the service module 17, but rather is tied to the using application via the configuration file 32.

Finally, it should also be emphasized that the service module 17 can also be used within the context of downloadable applications 16.

This is explained in more detail below.

The properties described here, in at least one embodiment, include that the architecture of the service modules 17 has at least one of the following advantages:

The configurable service module 17 allows the user to adapt the behavior of the service module 17 to suit the requirements of the using application 16 and of the resources present by virtue of the user additionally configuring adaptation implementations 21 for the service module 17. In this context, there may be a plurality of different adaptation implementations 21 for the same adaptation interface 20.

The user can also adapt the behavior of the service module 17 by configuring suitable selection methods. The configured selection methods implement the selection strategy for what adaptation implementation 21 is to be used at what times from the set of available adaptation implementations.

Finally, the user is also able to determine the further service modules 22 to be used through configuration. In this context, it should be emphasized that the dependencies on further service modules 22 are not rigidly implemented within the service module 17 but rather can be made available to the service module 17 via configuration.

The configurability allows the service module 17 to be adapted to suit the widest variety of requirements.

Another advantage is that the form of the service module 17 does not produce any kind of concurrent activity besides the calling application. This is of particular advantage in an environment with concurrent activities and a plurality of users. The users do not require a deeper understanding of the internal concurrent activities within the service module 17. Rather, the internal concurrent activities within the service module 17 are isolated from the application.

Another advantage is that the application 16 and the service module 17 and also the adaptation implementations 21 and the further service modules 22 to be used are independent of one another in terms of the version. This allows individual modules 17 to be interchanged without the user noticing. This is made possible through the stringent separation of the service interface 19 and the service implementation 18 and also the production of instances by the runtime environment 30 in line with the configuration file 32.

Finally, another advantage is that the visibility of the service module 17 is configurable. This allows a programmer to stipulate at the time of configuration which service modules 17 are to be used jointly by applications 16 and which are intended to be service modules 17 associated exclusively with particular applications 16.

As explained in more detail below, the service module 17 can be downloaded when required. The service module 17 therefore does not need to be permanently installed in advance.

Occasionally, services also need to be provided beyond machine boundaries. In this regard, FIG. 1 will be considered again. A user works on the diagnostic appliance 8 in the morning, for example, using a particular application 16 and stores his settings for the application 16. Typical examples of such preferences are the style of the graphical user interface, initial values, specimens and the like. When the user works on the diagnostic appliance 9 again in the afternoon using the application 16, the user sometimes wants the application 16 running on the diagnostic appliance 9 to take account of his preferences created in the morning.

Figure 6:
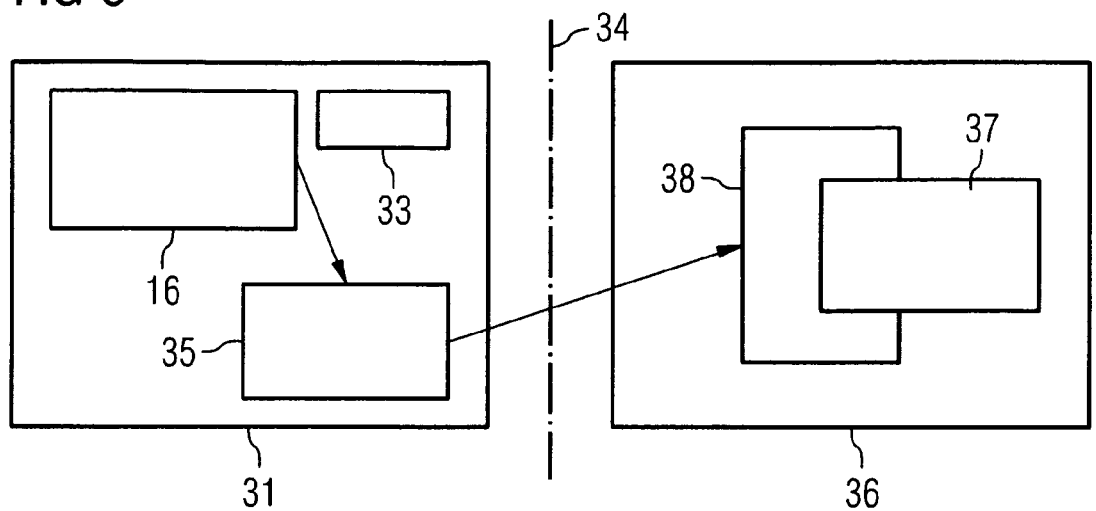
FIG. 6 shows the structure of service modules which allow services to be provided beyond machine boundaries.

FIG. 6 shows one possible solution for the provision of services beyond a machine boundary 34. A local machine, for example the diagnostic appliance 8 or 9, is running the application 16, which accesses a proxy service module 35, in a container process 31. The proxy service module 35 is designed on the basis of the service module 17 and, in accordance with the service module 17, is additionally configured for the application 16. In addition, the proxy service module 35 implements the same service interface 19 for the application 16 as the service module 17.

However, the proxy service module 35 forwards the requests created by the application 16 to a server process 36 running on a remote machine, for example the server 10 shown in FIG. 1. Within the server process 36, it is possible, as FIG. 6 shows, for any server service 37 to run which does not necessarily have to be designed in line with the architecture explained with reference to FIGS. 2 to 5. The actual server service 37 may also be preceded by a request forwarder 38.

Figure 7:
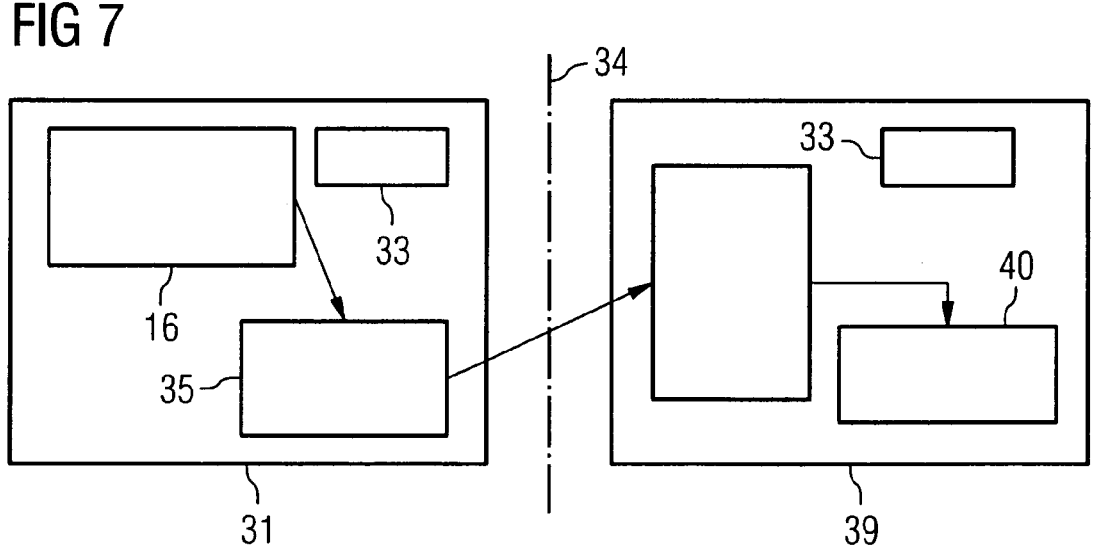
FIG. 7 shows a further structure of service modules which interact beyond machine boundaries.

In addition, as FIG. 7 shows, it is also possible for the remote machine to run a server process 39 which provides a runtime environment, corresponding to the runtime environment 30, including the service repository 33. In the server process 39, it is possible for a server service module 40 designed in line with the service module 14 to run which receives the requests forwarded by the proxy service module 35 from a request forwarder 41.

The requests created by the application 16 are now processed as follows:

The calling unit 24 of the proxy service module 35 places the requests received from the application 16 into a queue. The associated internal execution unit 25 becomes active as soon as a message is in the queue and there is a connection to the remote server service module 40 or to the server service 37. Responses received from the remote server service 37 or server service module 40 can be kept in the proxy service module 35 and hence used again at a later time for identical requests. Thus, the remote service module 40 or the remote server service sometimes appears to be available while there is no connection.

Responses which are not kept or responses which have become invalid have the result that relevant requests need to be sent to the remote service module 40 or to the remote server service 37 again. Besides responses, it is also possible for requests to be kept locally until the connection to the remote service module 40 or to the remote server service 37 has been set up. Thus, the requests do not need to be stored in the application 16 itself. The response times are therefore heavily dependent on the availability of the network connection and of the remote server service 37 or the remote server service 40.

The processing within the context of the server process 39 is subsequently continued. The processing within the context of the server service 37 takes place accordingly. The server process 39 involves the requests being accepted by the request forwarder 41 and forwarded to the service module 40. The service component 40 therefore sees just a local call, as though the server service module 40 were running in the container process of the requesting application 16. This means that neither the application 16 nor the remote service module 40 notices the distance and the communication link between them.

The request is forwarded to the remote service module 40 within the server process 39 using mechanisms which are specific to the respective server process 39. By way of example, the server process 39 could run on a web server, and the request forwarder 41 could be implemented as a web service which envelopes the remote server service module 40.

On account of the fact that the responses produced by the server process may experience a significant delay, the service interface 19 of the remote server service module 40 should provide only asynchronous methods. If the chosen communication protocol between the proxy service module 35 and the remote server service module 40 is a synchronous protocol, for example HTTP, then the request forwarder 41 needs to collect the progress reports and completeness reports in the server process 39 and return them as a collective result report when the request has ended, and the proxy service module 35 needs to condition this response such that the relevant progress reports and completeness reports are returned to the using application 16 in the correct order and in the correct context for the requesting process thread. The use of asynchronous protocols for the communication between the proxy service module 35 and the remote server service module 40 ensures much more realtime delivery of progress logs in comparison with when synchronous protocols are used. However, it is also possible to set up asynchronous communication on the basis of synchronous protocols.

In principle, it is possible for the server service module 40 also to be downloaded onto the local machine and to be addressed directly from the application 16. In this case, the configuration names the server service module 40 and not the proxy service module 35. In this modified configuration, the service is therefore provided locally without the application 16 or the server service module 40 undergoing a change.

If the downloaded server service module 40 in its implementation has direct dependencies in relation to standard software components, such as word processing, databases or image processors, there are the following options: the standard software components can likewise be downloaded. In addition, the standard software components can be addressed transparently on the remote machine. Finally, it is possible to encapsulate the access to the standard software components by a service module in another service module 22 which is to be used. This allows the further service module 22 which is to be used to be operated locally, while the standard software component used continues to be operated remotely.

It should be noted that the functionality in the server service module 40 needs to be programmed statelessly if a high level of scalability is to be achieved for use by a plurality of proxy service modules 35 on different machines. States relating to the applications 16 and the user sessions can then be held in the local proxy service modules 35.

Figure 8:
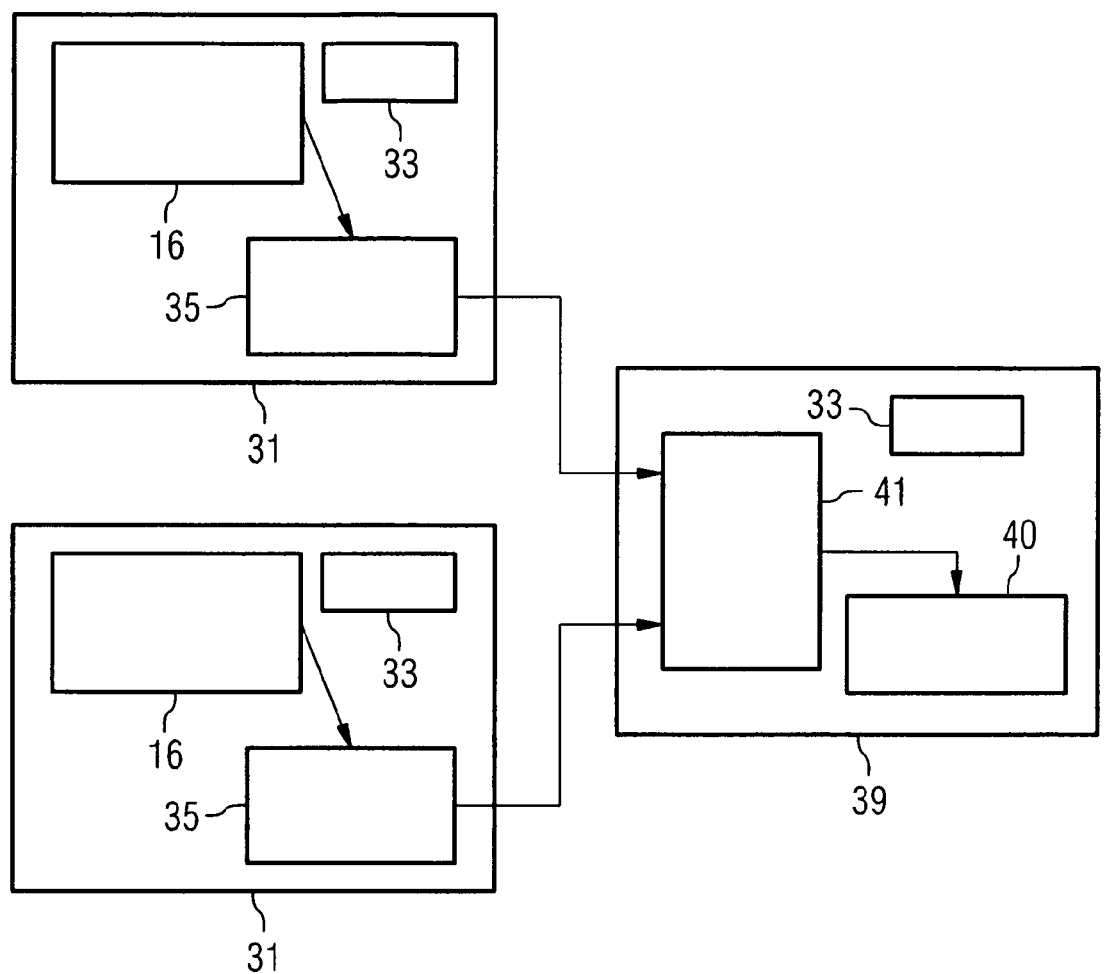
FIG. 8 shows the structure of a service module which has the function of a server with a standard interface for the requests from remote service modules.

FIG. 8 shows another modified embodiment. In this embodiment, all service modules have the same service interface 19, specifically regardless of whether they are service modules 17 which are usually used locally, proxy service modules 35 or server service modules 40. In this case, the service interface 19 contains just a single execution method with a message block as parameter. The application 16 produces the message block and thereby creates a request to the configured service module. If this is the local service module 17, the request is handled locally. If the service module is the proxy service module 35 or the server service module 40, however, the request is forwarded to the server process 36 or 39 whose address, for example a URL, is configured on the proxy service module 35. In this embodiment, the same service implementation of the proxy service module 35 can be used for all possible remote server service modules 40.

This embodiment also has the advantage that central management of the queue can additionally be implemented. This is because the use of the same service implementation 18 for the proxy service modules 35 allows the communication between the proxy service module 35 and the remote server service modules 40 to be controlled centrally on the server 10. In particular, the communication can be stopped and resumed again centrally by taking action on the server 10, without the applications 16 noticing anything apart from a delay in the responses. Such central management of the communication is appropriate particularly in cases in which large volumes of data are being moved but the system requires all of its resources for local time-critical tasks which need to be carried out without disruption.

The service module 40 meets additional requirements besides the requirements placed on the locally used service module 17: the server service module 40 can be used both in a single installation on a single computer and in distributed installations, but particularly also in situations in which applications 16 are not loaded onto a computer until required. In addition, the server service module 40 has been adapted to suit the requirements of the communication protocol for communication between the server service module 40 and the proxy service module 35. Finally, the proxy service module 35 is designed such that the service appears to be available to the application 16 even when the network connection has been interrupted or the central server 10 on which the server service module 40 is working is currently unavailable.

In addition, the example embodiments described with reference to FIGS. 6 to 8 also have the following additional advantages in comparison with the example embodiments described with reference to FIGS. 2 to 5: the architecture described with reference to FIGS. 6 to 8 allows service modules to be operated either locally or else beyond process and machine boundaries. In this context, the mode of operation is stipulated exclusively using configuration entries in associated configuration files 32. Neither the application 16 nor the server service module 40 need to be changed for this. Thus, it is possible in the case of smart clients and mobile applications to adapt the configuration for each computer such that the resources which are present on the computer are used in optimum fashion and the quantity of assemblies which needs to be downloaded can be limited.

In connection with applications 16 for intelligent clients (smart clients), however, additional problems also arise. This is because applications 16 of this kind are downloaded onto unknown machines when required. These machines have different resources, for example various graphics cards, different hard disk space, different memory expansion, different network connections—from a dialup modem to a gigabit network. Nevertheless, the application 16 needs to be presented to the user in the same way on each computer, even if the services required by the application 16 cannot be provided locally because the resources required for them are not available locally. For this reason, it is advantageous if, when downloading the application 16, the service modules 17, 35 and 40 to be used are configured in line with the resources present and the application 16 is provided with the appropriate service module 17 or the appropriate proxy service module 35 without the need for the application 16 to be adapted to suit the resources present.

The problems which arise in this context are explained again with reference to FIG. 1.

An application 16 for medical image processing can create surface reconstruction of large volumes of data. For this purpose, the entire data volume needs to be read into a service module 17 and processed. The application 16 running on one of the diagnostic appliances 8 or 9, for example, orders the service module 17 to handle the volume of data taking into account the preferences prescribed by the user, and then displays the results of the reconstruction. By way of example, this may be a film which shows the rotating surface of an organ in a patient who is being examined. The volumes of data to be processed may be of considerable extent.

If the service module 17 is intended to process 10 000 images, for example, with a data volume of 0.5 Mbyte each, then a total data volume of 5 Gbytes is obtained. It is therefore desirable to allow the service module 17 to access the data efficiently. In addition, the form of the service module 17 requires both a sufficiently large main memory and a sufficiently large amount of hard disk space. It is therefore appropriate to download the relevant service module 17 together with the application 16 onto the diagnostic appliances 8 and 9 only if there is a sufficiently large main memory and amount of hard disk space on the diagnostic appliances 8 and 9 and there is a fast network connection to the central data store 7.

However, if the same application 16 is downloaded onto the diagnostic appliance 14 via a modem link by a doctor in his doctor's practice, it is hardly possible to load all 10 000 images onto the diagnostic appliance 14 via the modem and to reconstruct them there, for time reasons. Instead, the images should be reconstructed in the medical data network 1 in this case. The service module 17 therefore does not need to be loaded onto the diagnostic appliance 14. Rather, it is sufficient to load a proxy service module 35 onto the diagnostic appliance 14, said proxy service module communicating with an associated server service module 40 which runs on the server 10 and which creates the reconstruction and communicates the result to the proxy service module 35.

Another example of the problems which arise with remote machines will be explained with reference to data interchange using the DICOM protocol.

In the field of medical diagnostics, medical data are usually transmitted using the DICOM protocol. The DICOM protocol involves a connection being set up between the computers involved, which act as DICOM nodes. The DICOM nodes usually need to be known to one another for security reasons. The handling of the DICOM protocol and the conditioning of the medical data for transport can be implemented as service modules 17, which can be used by a large number of applications 16 in order to read DICOM data or else to store them in a central archive. The local service module 17 could then have a DICOM implementation and could request the DICOM data directly from a known DICOM node.

If an application 16 is downloaded onto a computer, for example the diagnostic appliance 8 or 14, and if this computer is not known to the other DICOM nodes, the application 16 cannot use the DICOM protocol for directly requesting data from another DICOM node, for example the server 10. However, the application 16 can instruct a proxy service module 35 to interchange data using the DICOM protocol.

The proxy service module 35 then requests the DICOM data from a central web service, for example, using another communication protocol, for example http. The central web service can then act as a universally known DICOM node and can interchange the requisite DICOM data with the other DICOM nodes using the DICOM protocol.

Figure 9:
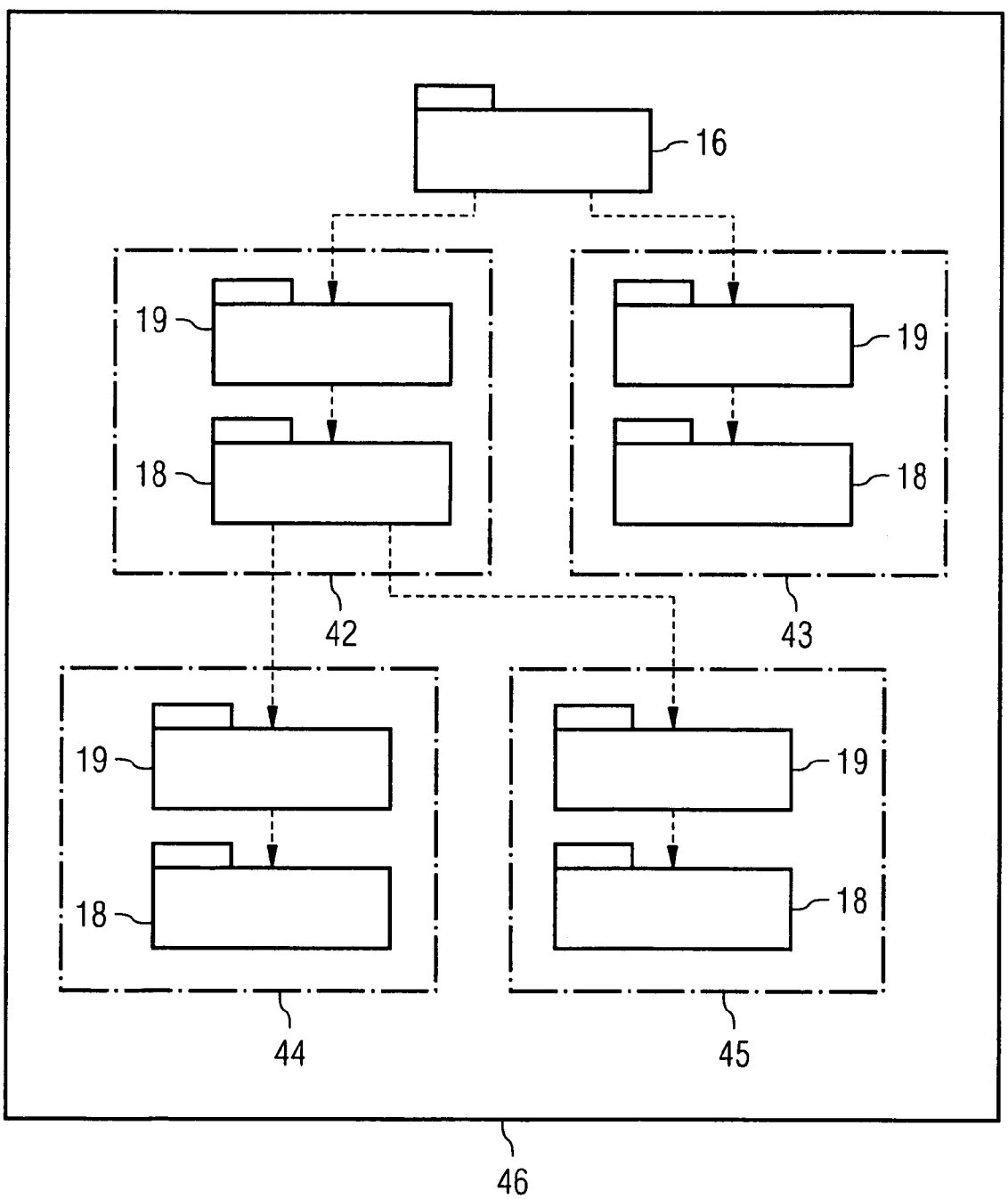
FIG. 9 shows the structure of the assemblies of various service modules on a local machine.

In this context, it should be noted that, in line with FIG. 9, an application 16 has a plurality of associated service modules 17. In FIG. 9, the application 16 accesses a first service module 42 and a second service module 43 directly, for example. The first service module 42 in turn accesses a third service module 44 and a fourth service module 45. The application 16 is therefore based on a network of service modules which comprises a plurality of layers of service modules.

The service modules 17 and 22 described with reference to FIGS. 2 to 8 and also the proxy service modules 35 and the server service modules 40 may now be distributed over various machines such that the network of service modules is optimally suited to the resources which are present. In FIG. 9, the resources are sufficient for the network of service modules and the application to be able to run on a target computer 46 onto which the application 16 together with the service modules 42 to 45 have been downloaded.

Figure 10:
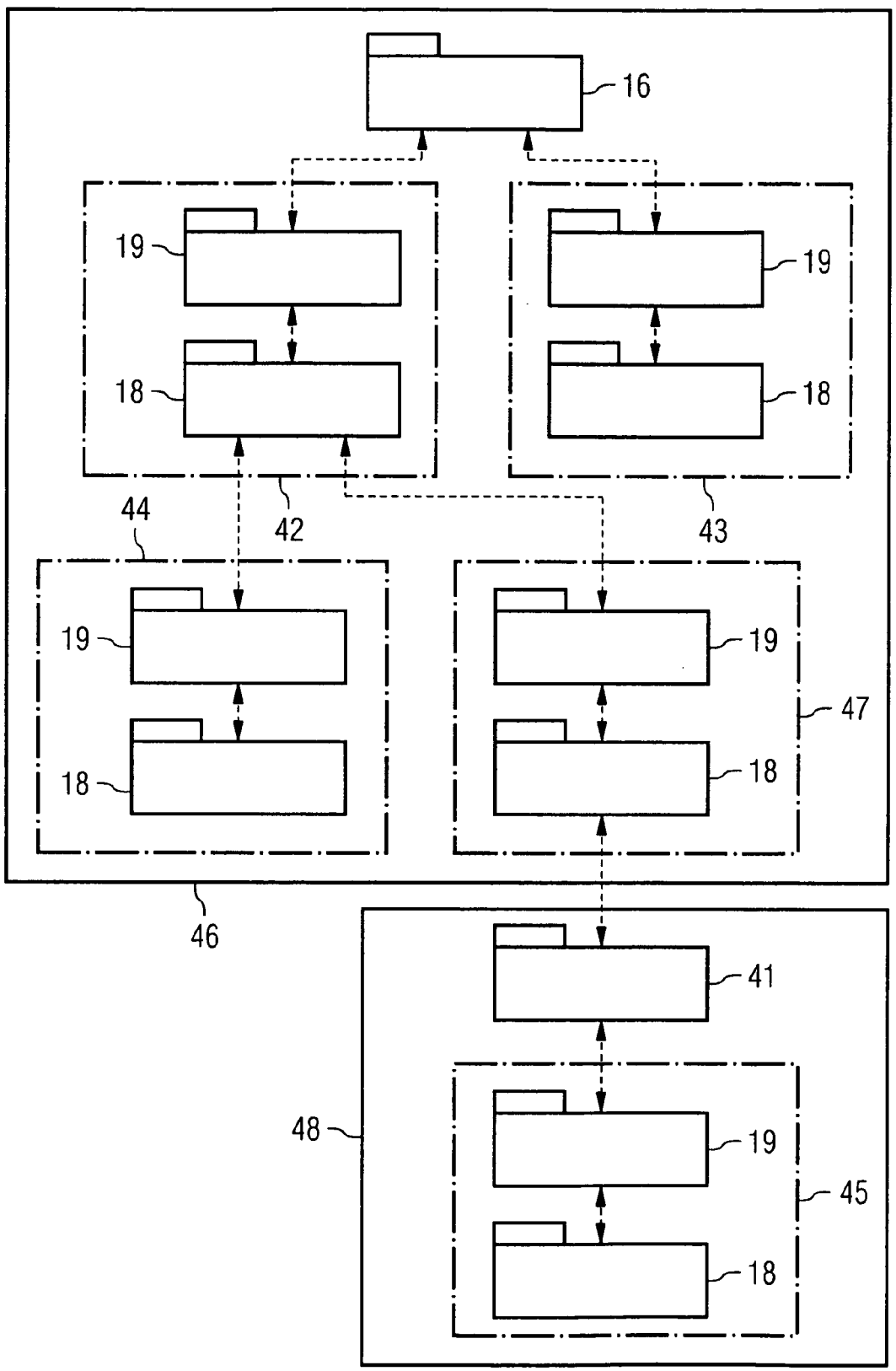
FIG. 10 shows the structure of the assemblies of various service modules which are distributed over a local and a remote machine.

By contrast, FIG. 10 shows the case in which the resources of the target computer 46 are not sufficient for the fourth service module 45. In this case, the fourth service module 45 is replaced on the target computer 46 by a modified fourth service module 47 whose service interface 19 corresponds to the service interface 19 of the fourth service module 45 but whose service implementation 18 is the service implementation of a proxy service module 35. The modified fourth service module 47 therefore forwards requests generated by the first service module 42 to the request forwarder 41 located on the server 10. This means that the application 16 has all the functionalities of the service layer available as though the service modules 42 to 45 were there locally on the target computer 46.

Figure 11:
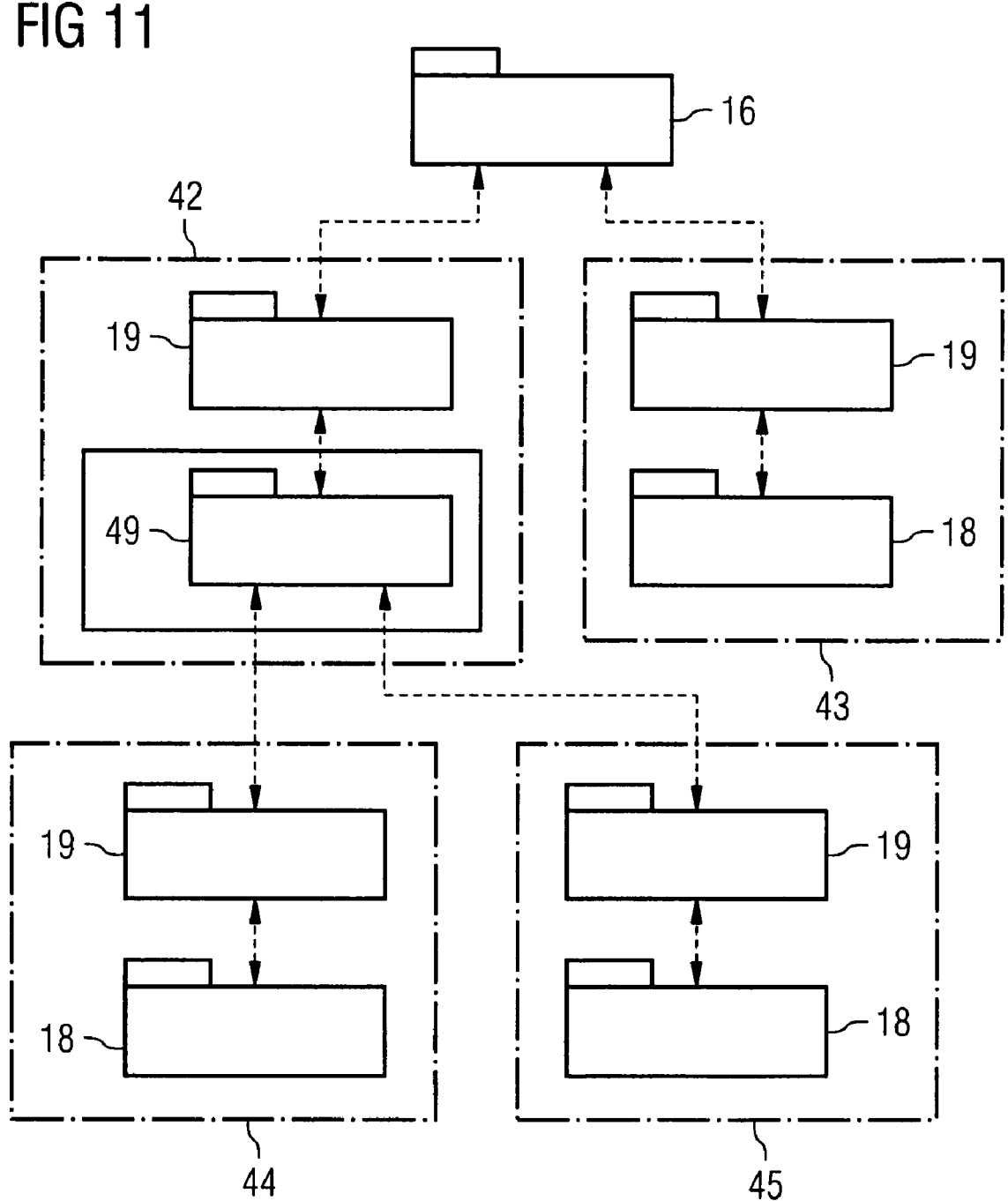
FIG. 11 shows the structure of the assemblies of various service modules where one assembly has been replaced by a newer version.

A further advantage of the service layer formed by service modules 42 to 45 is that a service implementation 18 of one of the service modules 42 to 45 can be interchanged without the need for the service layer to be translated or attached again. By way of example, the service implementation 18 in the first service module 42 has been replaced by a modified service implementation 49 in FIG. 11. The modified service implementation 49 can be incorporated by changing the configuration file 32. Neither the application 16 nor the service modules 44 and 45 used are affected and can continue to be used in their original version.

Figure 12:
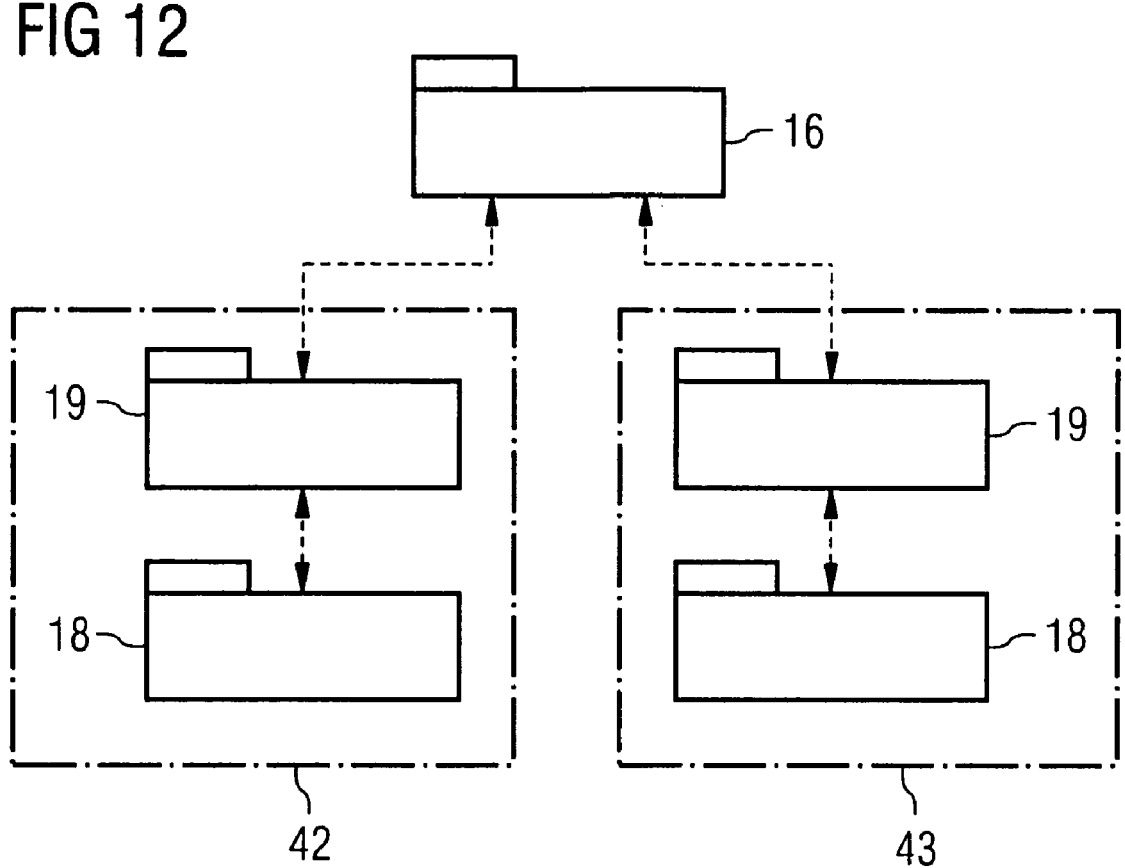
FIG. 12 shows the structure of assemblies of various service modules which differ in terms of completeness.

Finally, FIG. 12 shows the case in which some services on the target computer 46 are not required. By way of example, drives for local replaceable media may be omitted on the target computer 46, or else there may be no opportunities for audio output. Accordingly, the service modules 44 and 45 additionally configured for the first service module 42, for example, are omitted in the case shown in FIG. 12.

The service module 42 can now be programmed adaptively. Thus, the lack of the further service modules 44 and 45 to be used results in the relevant calls being skipped in the service implementation 18 of the first service module 42.

In addition, the first service module can also be set up explicitly for the lack of the service modules 45 and 46 to be used by using a version with a reduced scope of functions for the first service module 42, which version never uses the missing service modules 44 and 45, even if they are additionally configured for the first service module 42.

The service layer described with reference to FIGS. 9 to 12 is set up using configuration files 32 which are associated with the various downloadable applications 16. The configuration files 32 stipulate which service implementation 18 of a service module 17 is to be used on the various types of target computers 46. By way of example, they may contain the information that the service module 17 itself needs to be downloaded and then provides the service locally, or else that the proxy service module 35 is to be used and then handles the communication with the central server service module 40.

The descriptions for various types of target computers 46 may be created once in advance and then applied as required. Whenever an application 16 is to be downloaded, the type of the target computer 46 is first of all determined in line with the previously created description and then the configuration file 32 created for the respective type of target computer 46 is applied. The association between a target computer 46 and a particular type can be made centrally, for example, in a hospital's department which is responsible for information technology. This department normally inventories each installed target computer 46 and provides it with a unique computer name. In addition, the resources with which the target computer 46 is equipped are known, and hence also the type of the target computer 46. If requests to download an application 16 are now made by a particular target computer 46, the name of the requesting target computer 46 can be used to determine its type, and the most suitable versions of the service modules for the respective type can be downloaded on the basis of the created configuration file 32.

In a modified embodiment, a pathfinder program is first of all downloaded onto the target computer 46 and explores the properties of the target computer and ascertains the most suitable configuration file 32 for the respective target computer 46 at runtime, this configuration file then being used for the application 16 which is subsequently to be downloaded.

The service layer described here has a series of advantages:
The service layer allows the service modules 42 to 45 to be distributed over a plurality of machines without the users of the application 16 or the calling service module noticing anything of this. From the point of view of the application 16, a single local service layer exists.

The distribution strategy may also take account of a large number of different aspects.

Thus, services can respectively be provided on the computers which provide an appropriate level of efficiency in terms of their resources, namely memory expansion, special hardware, processor speed, network bandwidth, data access options and the like.

In addition, services can also be provided without a network connection, for example in the case of a mobile computer, by sending requests and orders even without a network connection. In this case, however, no responses are received while there is no network connection to the remote service module. Without a network connection, the service can be provided locally, however, if all the service modules required have been downloaded onto the local computer.

The distribution strategy can also ensure protection for intellectual property and can provide security against manipulation by virtue of service modules which contain program code to be protected being able to be executed only in a protected environment.

In addition, the distribution strategy can take account of the complexity of the loading operation. For example, if a downloaded service module requires local prerequisites, for example a local database, which likewise needs to be installed first before the service can be provided, then it is normally more efficient to request this service from a centrally available service module instead of downloading the service module and executing it locally.

In addition, the configurability of the service layer allows optimum adaptation to suit the circumstances of the target computer 46 without the need for the application 16 to be aware of this.

The hierarchic and configured design of the service layer using individual service modules allows individual service modules to have their version changed independently of one another. This allows step-by-step further development of the service layer without influencing the function of the service modules which are there in the layer.

Since each service module is independent of the service implementations of the other service modules, the power of the service layer can be reduced to precisely those service modules and functionalities which are also required in the specific case.

The text below describes a few possible application scenarios for the service modules described here:
Configuration Service:
  Client applications can be downloaded potentially onto any workstation when required. It is advantageous if the downloaded application also automatically uses the same configuration data as all other copies of the application. Configuration data can be prescribed throughout a company, specifically for the respective workstation or user and can be distributed using service modules which provide configuration services.
Data Transport Service:
  In the field of medical diagnostics, images are a fundamental source of information. For this reason, it is usually necessary to resort to medical images in order to produce medical diagnoses. The images are produced on a modality-specific data capture installation, for example a magnetic resonance appliance, a computer tomograph or an ultrasound appliance, are stored in an archive system and are loaded from there onto the workstations on which the diagnoses are produced. By way of example, the workstations are the diagnostic appliances 7, 8 and 14. Normally, the DICOM standard is used for the transport protocol and the data encoding of the images. If a client application requires access to medical images after download, it will use a data transport service module in order to do so.

Data Cache Service:

When a client application has been downloaded onto a workstation and the client application has likewise loaded images for itself onto the workstation using the data transport service, it is desirable for performance reasons to cache these data locally for a certain time, so that later access operations to these data do not result in new data transport using the data transport service and hence in delays. Another advantage of a data cache service is the data availability even in the case of a temporary lack of access to the network, for example in the case of a mobile computer. A data cache service module of this kind needs to contain strategies for data integrity, data consistency and limiting of required resources.

Apart from image data, it is also desirable to hold other relevant information in a local buffer store, for example configuration data which have originally been read from the configuration service. This means that it is possible to start an already downloaded client application with the correct, last used configuration data even when there is no network connection.

In addition, it is important in a data cache service to buffer-store the freshly produced data on a client workstation too. This is because in the case of a mobile workstation with only temporarily available network access it should nevertheless be possible for the application to be able to store the data virtually in the remote archive, even if the physical data transfer to the remote archive using the data transport service does not take place until the network connection has been restored. The data management strategy needs to ensure that freshly produced data are removed from the buffer store only if they have also been successfully transported to the remote archive beforehand.

Data integrity service:

Medical images and diagnostic information are sensitive data which need to be able to be accessed only by a defined group of people and only for a limited time: those authorized to access them are managed and checked in a data integrity service. Obviously, the same data integrity needs to be ensured on all workstations, regardless of the workstation onto which a client application has been downloaded.

Licensing Service:

Software manufacturers have an interest in actually receiving suitable payment for the use of functionalities of the client application by the user. This requires that, regardless of the workstation onto which the client application has been downloaded, only those functions for which the user has paid a fee can be used. With the service modules described here, this licensing also works on workstations on which there is temporarily no network access.

Data Management Service:

A user needs to select the data which he requires in order to make a diagnosis. For this purpose, regardless of the workstation onto which it has been downloaded, the client application needs to provide the user with an overview of the data which he can currently access, so that the user can make a valid selection. Management of the stock of data which the user can currently see is undertaken by the data management service.

Data Access Service:

Following stipulation of the data to be loaded and the possible transport of these data from a remote archive, client applications need to be read and processed within the application. In the case of medical images, this usually means processing data in the DICOM format. For efficient access to DICOM data, it is helpful to read the entire DICOM data stream and to hold the contents in altered format in the memory, for example using a hash table, to allow rapid access. Hence, although the application also needs to know DICOM attributes, it requires no functionalities which are required for analyzing a DICOM data stream.

Image Processing Services:

When medical images have been read by the client application, their pixel data need to be shown and any postprocessing needs to be initiated, for example changing the image contrast, creating three-dimensional surfaces, shadows and the like. The relevant algorithms are encapsulated in an image processing service, so that they are likewise available to other client applications and the image quality does not differ between the individual applications for the same image. It is also possible for an image processing service to run on a remote computer and to transmit only the pixels of the respective screen detail for display to the client application.

Queue Service:

The medical sector sometimes uses very large volumes of image data. Particularly sending, printing or complex post-processing of large image data records is a laborious task, particularly when the required network is temporarily unavailable, which is often the case with a mobile computer or workstation, for example. In such cases, a client application can start the instruction by virtue of the client application transferring the instruction to the queue service, so that the application can then continue other instructions without needing to concern itself further with an instruction which takes a long time.

Another application of the queue service is managing instructions to a service unit which can only ever execute a maximum of one instruction at a particular time, for example a printer or a DVD burner.

A queue service should be able to be used by any workstation onto which it is possible to load a client application. The features of interest in a queue service also include the ability to process the instructions given, for example prioritization, stopping, deleting and resuming instructions.

Maintenance Service:

In the event of errors on a workstation, error analysis functions can be used or else an error report can just be sent to a central location. Such maintenance-related functionalities are provided by a maintenance service for all workstations onto which a client application has been downloaded.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus for processing data including a service module, in different modalities, with a multiplicity of resources used for data processing, usable to execute at least one application for which the service module provides services, the service module comprising:
   a service interface in a service interface assembly stored in a computer; and
   a service implementation in a service implementation assembly stored in the computer and separate from the service interface assembly, the at least one application having a reference to the service interface assembly, and the service interface making the service module available to at least one application, the service implementation assembly configured to implement the services accessed by the at least one application via the service interface assembly, and the service implementation being modifiable at a time of loading, using configuration data from a runtime environment, a visibility of the service module being stipulated by the configuration data, wherein the runtime environment produces an instance of the service module on the basis of the configuration data, and the instance produced is managed in a repository in the runtime environment.

2. The apparatus as claimed in claim 1, when an already produced instance of a service module is present, the runtime environment returns a reference to the already produced instance upon a call for the service module.

3. The apparatus as claimed in claim 1, wherein the configuration data are application specific.

4. The apparatus as claimed in claim 1, wherein the configuration data are transport specific.

5. The apparatus as claimed in claim 4, wherein the service module is equipped with a communication interface to communicate with a remote service module.

6. The apparatus as claimed in claim 4, wherein the service module has a function of a proxy.

7. The apparatus as claimed in claim 4, wherein the service module has a function of a server.

8. The apparatus as claimed in claim 1, wherein there are at least two service modules, and wherein the service modules have a common communication interface for communicating beyond machine boundaries.

9. The apparatus as claimed in claim 1, wherein the configuration data are resource specific.

10. The apparatus as claimed in claim 9, wherein the configuration data are determinable at the time of installation by a pathfinder program which determines available resources.

11. The apparatus as claimed in claim 1, wherein the service module comprises an assembly which contains an adaptation interface.

12. The apparatus as claimed in claim 11, wherein an adaptation implementation, implementing the adaptation interface, is additionally configurable for the service module.

13. The apparatus as claimed in claim 1, wherein a further service module, usable by the service module, is additionally configurable for the service module.

14. The apparatus as claimed in claim 11, wherein the service module has an internal repository for managing references to usable adaptation implementations.

15. The apparatus as claimed in claim 1, wherein the apparatus is used for processing medical data in different modalities.

16. The apparatus as claimed in claim 15, wherein the medical data in different modalities are processed by executing a multiplicity of applications which together form a work process and which access common service modules.

17. The apparatus as claimed in claim 1, wherein there are at least two service modules, and wherein the service modules form a configurable service layer.

18. The apparatus as claimed in claim 1, wherein, when an already produced instance of the at least one service module is present, the runtime environment returns a reference to the already produced instance upon a call for the at least one service module.

19. The apparatus as claimed in claim 1, wherein the configuration data are application specific.

20. The apparatus as claimed in claim 1, wherein the configuration data are transport specific.

21. A method for processing data in different modalities, in which a multiplicity of resources for data processing are used to execute an application for which a service module provides services, the method comprising:
   using an application to access a service implementation contained in a service implementation assembly via a service interface contained in a separate service interface assembly, wherein the application contains a reference to the service interface assembly and the service interface makes the service module available to the application;
   setting up the service implementation at a time of loading using configuration data, a visibility of the service module being stipulated by the configuration data;
   producing instances of the service module by a runtime environment;
   managing the produced instances of the service module in a repository in the runtime environment.

22. The method as claimed in claims 21, wherein the runtime environment respectively produces an instance of the service module, and wherein a fresh call for the service module prompts a reference to the already produced instance of the service module to be returned.

23. The method as claimed in claim 21, wherein the configuration data for the respective application are created specifically at the time of design.

24. The method as claimed in claim 21, wherein the configuration data are created on a transport specific basis at least one of at the time of design and at the time of installation.

25. The method as claimed in claim 21, wherein the service module communicates with a remote service module beyond machine boundaries.

26. The method as claimed in claim 25, wherein the service module is used as a proxy.

27. The method as claimed in claim 25, wherein the service module is used as a server.

28. The method as claimed in claim 25, wherein the communication between service modules is carried out using a communication interface which is of the same design for all service modules involved in the communication.

29. The method as claimed in claim 21, wherein the configuration data are created on a resource specific basis at the time of design or at the time of installation.

30. The method as claimed in claim 29, wherein the configuration data are created at the time of installation by a pathfinder program on the basis of the resources which are present on a target computer.

31. The method as claimed in claim 21, wherein the service implementation is modified at the time of loading in line with the configuration data via a separately assembled adaptation interface using an adaptation implementation.

32. The method as claimed in claim 31, wherein references to service modules and adaptation implementations are assigned to an internal repository of the service module by the runtime environment.

33. The method as claimed in claim 21, wherein a further service module is made available to the service module at the time of loading by the runtime environment in line with the configuration data.

34. The method as claimed in claim 33, wherein references to service modules and adaptation implementations are assigned to an internal repository of the service module by the runtime environment.

35. The method as claimed in claim 21, wherein the runtime environment respectively produces an instance of the service module, and wherein a fresh call for the service module prompts a reference to the already produced instance of the service module to be returned.

36. A non-transitory computer readable medium including program segments for, when executed on a computer device, processing data in different modalities, in which a multiplicity of resources for data processing are used to execute an application for which a service module provides services, causing the computer device to perform steps comprising:
    using an application to access a service implementation contained in a service implementation assembly via a service interface contained in a separate service interface assembly, wherein the application contains a reference to the service interface assembly and the service interface makes the service module available to the application;
    setting up the service implementation at a time of loading using configuration data, a visibility of the service module being stipulated by the configuration data;
    producing instances of the service module by a runtime environment;
    managing the produced instances of the service module in a repository in the runtime environment.

* * * * *